United States Patent
Melkote Krishnaprasad et al.

(10) Patent No.: US 10,861,215 B2
(45) Date of Patent: Dec. 8, 2020

(54) ASYNCHRONOUS TIME AND SPACE WARP WITH DETERMINATION OF REGION OF INTEREST

(71) Applicant: QUALCOMM Incorporated, San Diego, CA (US)

(72) Inventors: Vinay Melkote Krishnaprasad, Bangalore (IN); Sudipto Banerjee, Kolkata (IN); Pawan Kumar Baheti, Bangalore (IN); Ajit Venkat Rao, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 16/181,288

(22) Filed: Nov. 5, 2018

(65) Prior Publication Data
US 2019/0333263 A1 Oct. 31, 2019

(30) Foreign Application Priority Data
Apr. 30, 2018 (IN) .............................. 201841016253

(51) Int. Cl.
*G06T 15/00* (2011.01)
*G06T 7/536* (2017.01)
(Continued)

(52) U.S. Cl.
CPC ............ *G06T 15/005* (2013.01); *G06F 3/012* (2013.01); *G06F 3/013* (2013.01); *G06K 9/3233* (2013.01); *G06T 7/536* (2017.01); *G06T 7/73* (2017.01)

(58) Field of Classification Search
CPC ......... G06T 15/005; G06T 7/73; G06T 7/536; G06F 3/012; G06F 3/013; G06K 9/3233
See application file for complete search history.

(56) References Cited

U.S. PATENT DOCUMENTS

2014/0049452 A1* 2/2014 Maltz .................. G02B 27/017
345/8
2014/0247277 A1* 9/2014 Guenter ................. G06T 11/40
345/611
(Continued)

OTHER PUBLICATIONS

Lin J., et al., "Advanced Texture and Depth Coding in 3D-HEVC", Journal of Visual Communication and Image Representation, Academic Press, Inc, US, vol. 50, Nov. 16, 2017 (Nov. 16, 2017), pp. 83-92, XP085479138, ISSN: 1047-3203, DOI: 10.1016/J.JVCIR.2017.11.003.
(Continued)

*Primary Examiner* — Yu Chen
(74) *Attorney, Agent, or Firm* — Campbell C. Chiang; Arent Fox LLP

(57) ABSTRACT

A method and a system for warping a rendered frame is disclosed. On a host device of a split-rendering system, the method includes generating the rendered frame based on head tracking information of a user. The method also includes identifying a region of interest (ROI) of the rendered frame. The method also includes generating metadata for a warping operation from the ROI. The method further include transmitting the rendered frame and the metadata for a warping operation of the rendered frame. On a client device of the split-rendering system, the method includes transmitting head tracking information of a user by a client device. The method also includes receiving the rendered frame and metadata. The method further includes warping the rendered frame using the metadata and display pose information. The host device and the client device may be combined into an all-in-one head mounted display.

8 Claims, 9 Drawing Sheets

(51) Int. Cl.
  G06T 7/73    (2017.01)
  G06K 9/32    (2006.01)
  G06F 3/01    (2006.01)

(56) References Cited

U.S. PATENT DOCUMENTS

| | | | | |
|---|---|---|---|---|
| 2016/0042554 | A1* | 2/2016 | Ogan | G06F 3/0304 |
| | | | | 345/419 |
| 2017/0243324 | A1* | 8/2017 | Mierle | G06T 19/006 |
| 2017/0345220 | A1* | 11/2017 | Bates | G06T 7/50 |
| 2018/0081429 | A1* | 3/2018 | Akenine-Moller | G06F 3/14 |
| 2018/0144437 | A1* | 5/2018 | Kakarlapudi | G09G 5/026 |
| 2018/0196511 | A1* | 7/2018 | Chae | G06F 3/011 |
| 2018/0293786 | A1* | 10/2018 | Insko | G06T 15/405 |
| 2018/0300934 | A1* | 10/2018 | Kuwahara | G06T 15/005 |
| 2018/0322683 | A1* | 11/2018 | Dimitrov | G06F 3/1446 |
| 2019/0155372 | A1* | 5/2019 | Cuervo | H04B 10/11 |
| 2019/0361526 | A1* | 11/2019 | Young | G06F 3/011 |
| 2020/0058152 | A1* | 2/2020 | Zhang | G06T 15/005 |

OTHER PUBLICATIONS

Partial International Search Report—PCT/US2019/021669—ISA/EPO—May 20, 2019.
International Search Report and Written Opinion—PCT/US2019/021669—ISA/EPO—Jul. 11, 2019.

* cited by examiner ically responsible for preparing the image content information for display at the wearable display device.

ASYNCHRONOUS TIME AND SPACE WARP WITH DETERMINATION OF REGION OF INTEREST

CROSS-REFERENCE TO RELATED APPLICATION(S)

The application claims the priority benefit of Indian application serial no. 201841016253, entitled "ASYNCHRONOUS TIME AND SPACE WARP WITH DETERMINATION OF REGION OF INTEREST" and filed with the Indian Patent Office on Apr. 30, 2018, which is expressly incorporated by reference herein in its entirety.

TECHNICAL FIELD

The disclosure relates to processing of image content information and, more particularly, post-processing of image content information for output to a display.

BACKGROUND

Split-rendered systems may include at least one host device and at least one client device that communicate over a network (e.g., a wireless network, wired network, etc.). For example, a Wi-Fi Direct (WFD) system includes multiple devices communicating over a Wi-Fi network. The host device acts as a wireless access point and sends image content information, which may include audio video (AV) data, audio data, and/or video data, to one or more client devices using one or more wireless communication standards, e.g., IEEE 802.11. The image content information may be played back at both a display of the host device and displays at each of the client devices. More specifically, each of the participating client devices processes the received image content information for presentation on its display screen and audio equipment. In addition, the host device may perform at least some processing of the image content information for presentation on the client devices.

The host device and one or more of the client devices may be either wireless devices or wired devices with wireless communication capabilities. In one example, as wired devices, one or more of the host device and the client devices may comprise televisions, monitors, projectors, set-top boxes, DVD or Blue-Ray Disc players, digital video recorders, laptop or desktop personal computers, video game consoles, and the like, that include wireless communication capabilities. In another example, as wireless devices, one or more of the host device and the client devices may comprise mobile telephones, portable computers with wireless communication cards, personal digital assistants (PDAs), portable media players, or other flash memory devices with wireless communication capabilities, including so-called "smart" phones and "smart" pads or tablets, or other types of wireless communication devices (WCDs).

In some examples, at least one of the client devices may comprise a wearable display device. A wearable display device may comprise any type of wired or wireless display device that is worn on a user's body. As an example, the wearable display device may comprise a wireless head-worn display or wireless head-mounted display (WHMD) that is worn on a user's head in order to position one or more display screens in front of the user's eyes. The host device is typically responsible for performing at least some processing of the image content information for display on the wearable display device. The wearable display device is

SUMMARY

In general, this disclosure relates to techniques for correcting for camera translation and rotation (e.g., moving the wearable display device towards or away from a virtual object) from a position of the camera used to render a frame to a position of the camera when the rendered frame is displayed to the user on the wearable display device. When a host device renders an image based on the last head pose received from a head tracker of the wearable display device, by the time the image is rendered and available for display to a user on the wearable display device, the user's head pose may have moved. A host device may have per-pixel depth data that may be used to correct for camera translation and rotation. However, in split-rendered systems (e.g., where both the host device and the wearable display device process image data such as in gaming virtual reality (VR), augmented reality (AR) applications, etc.), transmitting per-pixel depth data from the host device to the wearable display device, which is an example of a client device, may consume significant bandwidth.

The techniques of this disclosure are directed to systems that permit time and space warping of a rendered frame to correct for the movement of head position and scene motion where the metadata that aids the time and space warping is determined by identifying a region of interest. Time and space warping using a region of interest reduces the effective motion-to-photon latency associated with the movement of the head position as well as the positional judder associated with rendering at a frame rate slower than the display refresh rate without requiring transmitting/receiving per-pixel depth data such as the depth buffer. Using metadata from a region of interest for time and space warping also reduces the positional judder and other display artifacts associated with other time space warping techniques. The region of interest may be determined based on eye tracking or content information. For example, a host device of a split-rendered system may generate a single depth plane for a region of interest of a scene to emphasize contribution from the region of interest. The value and parameters for the single depth plane may be determined based on eye-tracking information.

In one aspect, the metadata from a region of interest used to aid time and space warping may include metadata for sampling and filtering motion vectors of moving objects in a rendered frame. For example, a host device and a display device of a split-rendered system may determine a region of interest in an eye-buffer frame based on content or eye-tracking information. The host device may determine a motion vector grid size based on an analysis of the content within the region of interest. The motion vector grid size may represent a grid of vertices overlaid on the eye-buffer to sample the motion vectors. The choice of the motion vector grid size may affect the quality of the warped frame such as disocclusions and distortion at the corners of the moving objects. The display device may determine a motion vector filter kernel size based on an analysis of the content within the region of interest. The motion vectors may be filtered using the motion vector filter kernel size to smooth out large difference in motion vectors between neighboring vertices. The choice of the motion vector filter kernel size may affect the folding of background objects on top of foreground objects and the stretching and deformation of objects. The content of the region of interest may be analyzed to make trade-offs between the motion vector grid size, motion vector filter kernel size, positional judder, and texture stretching to fill disocclusions.

In one aspect, the content of the region of interest may be analyzed to determine the warping techniques that may produce less display artifacts. In one aspect, the metadata from the region of interest may include the computation of potentially visible set of triangles of objects in a scene for a technique called vector streaming that addresses disocclusions when warping to a new pose. The region of interest obtained via eye tracking may be used to generate the potentially visible set of triangles behind the visible scenes in the region of interest.

In one aspect, the region of interest may be determined by the content information in a rendered frame. For example, one or more characters or objects in a scene may be marked as salient and the region of interest in an eye-buffer may include the segment that contains the salient content. In one example, the region of interest may include a moving object as the motion in the scene draws a user's focus.

In one aspect, a method for generating metadata by a host device to aid warping of a rendered frame is disclosed. The method includes generating the rendered frame based on head tracking information of a user. The method also includes identifying a region of interest (ROI) of the rendered frame. The method also includes generating metadata for a warping operation from the ROI. The method further include transmitting the rendered frame and the metadata for a warping operation of the rendered frame.

In one aspect, a method for warping a rendered frame by a client device is discloses. The method includes transmitting head tracking information of a user. The method also includes receiving a rendered frame and metadata. The rendered frame is based on the head tracking information and the metadata is based on a region of interest (ROI) of the rendered frame. The method further includes warping the rendered frame using the metadata and display pose information.

The details of one or more examples of the disclosure are set forth in the accompanying drawings and the description below. Other features, objects, and advantages will be apparent from the description, drawings, and claims.

DETAILED DESCRIPTION

Figure 1:
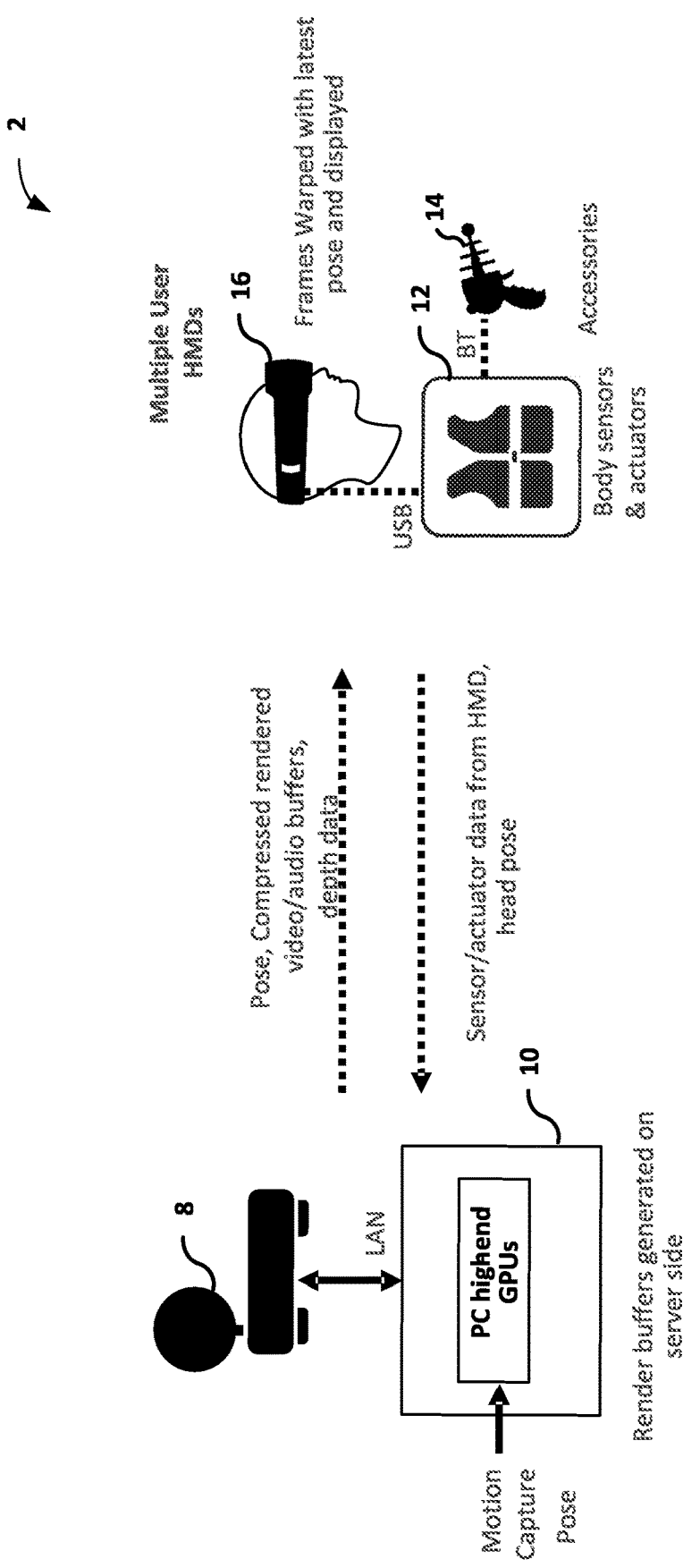
FIG. 1 is a block diagram illustrating a split-rendered system including a host device and a wearable display device.

Imaging systems may generate a 360-degree image (e.g., canvas) for displaying video. For example, an imaging system may output a portion of the canvas that is in a user's field of view at a virtual reality (VR) headset.

Some imaging systems may be split-rendered. An example split-rendered system may include a host device (e.g., computer, cloud, etc.) that generates a compressed rendered video buffer (and a compressed rendered audio buffer) and a client device (e.g., a head-mounted display (HMD)) that decompresses the compressed rendered video buffer (and audio buffer) for display at the client device.

In split-rendered systems, a client device may output an head pose indicating a user's field of view. The host device may generate compressed rendered video/audio buffers for the head pose. However, split-rendered systems may have a small process time (e.g., 20 milliseconds) between sending the head pose and outputting the rendered video/audio buffers. This delay may cause the actual content being rendered to represent an earlier head pose, rather than the current head pose. For example, the user may rotate her head slightly while the split-rendered system processes the rendered video. In this case, the content the that user is viewing is from a different, earlier field of view than her current field of view, resulting in negative experience.

In order to account for process time in split-rendered systems, which results in delay in the display, client devices may perform time and space warping to correct for evolution of head position and scene motion from their state in the last fully rendered frame. For example, a client device may first fully render a frame based on the received content, where the rendered frame is based on earlier head pose, and then the client device may perform an Asynchronous Time Warp (ATW) that corrects for a rotation of a user's head.

More specifically, for instance, the client device may include a graphics processing unit (GPU) that receives image content information from the host device, and the image content information that the device receives may be based on the position of the eye(s) or head of the user of the client device at the time the client device requests the image content information. For an eye buffer round, the GPU of the client device may generate a rendered frame based on the received image content information. However, the position of the user's eye(s) or head may have changed from the time of the request to the present time. Accordingly, in a warping round, the GPU of the client device may warp (e.g., shift, rotate, stretch, or otherwise modify) the image content generated in the eye buffer round to accommodate for any change in the position of the user's eye(s) or head of the client device.

However, ATW techniques may not correct for a movement of a user's field of view toward (or away from) an object in a scene. Such ATW techniques that accounts only for orientation change of the user (3 degrees of freedom (DOF)) may result in "positional judder," especially for objects of the scene that are near the user in the virtual space. One way for the client device to account for head translation in relation to objects in the scene is by utilizing per-pixel depth data (e.g., Z-buffer); however, such per-pixel depth data may not be easily accessible by the client device. In the context of split-rendered systems (e.g., gaming VR) such per-pixel depth data is readily available at the host device (e.g., rendering engine). However, transmitting per-pixel depth data from the host device to the client device may consume significant bandwidth. One technique to correct positional judder and other display artifacts is to exploit additional information such as depth and/or motion vectors of a rendered scene to approximate a 6 DOF ATW without requiring knowledge of the complete Z-buffer.

The techniques of this disclosure are directed to split-rendered systems that permit time and space warping to correct for movement of head position (e.g., camera translation) and scene motion from their state in the last fully rendered frame using metadata that aids the time and space warping by identifying a region of interest. In some embodiments such as metadata aiding for ATW or a modified version of ATW referred to as Asynchronous Planar Re-projections (APR), the techniques obviate the need for transmitting/moving a full depth buffer, which may be expensive in bandwidth, latency, and power, while still retaining most of the improvements of moving from 3 DOF ATW to 6 DOF ATW. Using metadata from a region of interest for time and space warping reduces the positional judder and other display artifacts in areas that the user is actively focusing on or is very likely to focus on, unlike other time space warping techniques that are agnostic to such region of interest information. The region of interest may be determined based on eye tracking or content information. For example, in APR, a host device of a split-rendered system may generate a single depth plane metadata for a region of interest in a scene. The value and parameters for the single depth plane may be determined based on eye-tracking information. In one aspect, in Asynchronous Space Warp (ASW), a technique that extrapolates the motion of objects while performing warping, a host device of a split-rendered system may determine a motion vector grid size used for sampling motion vectors based on an analysis of content within the region of interest. In one aspect, in ASW, a display device may determine a motion vector filter kernel size used for filtering motion vectors based on an analysis of content within the region of interest. The region of interest that contains the content information of a scene for the analyses may be determined based on eye tracking.

FIG. 1 is a block diagram illustrating split-rendered system 2 including a host device 10 and wearable display device 16. In the example of FIG. 1, split-rendered system 2 includes host device 10 and only one client device, i.e., wearable display device 16. In other examples, split-rendered system 2 may include additional client devices (not shown), which may comprise wearable display devices, wireless devices or wired devices with wireless communication capabilities.

In some examples, split-rendered system 2 may conform to the Wi-Fi Direct (WFD) standard defined by the Wi-Fi Alliance. The WFD standard enables device-to-device communication over Wi-Fi networks, e.g., wireless local area networks, in which the devices negotiate their roles as either access points or client devices. Split-rendered system 2 may include one or more base stations (not shown) that support a plurality of wireless networks over which a communication session may be established between host device 10, wearable display device 16, and other participating client devices. A communication service provider or other entity may centrally operate and administer one or more of these wireless networks using a base station as a network hub.

According to the WFD standard, host device 10 may act as a wireless access point and receive a request from wearable display device 16 to establish a communication session. For example, host device 10 may establish the communication session between host device 10 and wearable display device 16 using the Real-Time Streaming Protocol (RTSP). A peer-to-peer (P2P) group communication session may be established over a wireless network, such as a Wi-Fi network that uses a wireless communication standard, e.g., IEEE 802.11a, 802.11g, or 802.11n improvements to previous 802.11 standards. In one embodiment, the host device 10 may exist in the cloud and the client device may connect to the host device 10 over cellular networks including 4g or 5g networks.

Once the P2P group communication session is established, host device 10 may send image content information, which may include audio video (AV) data, audio data, and/or video data, to wearable display device 16, and any other client devices participating in the particular communication session. For example, host device 10 may send the image content information to wearable display device 16 using the Real-time Transport protocol (RTP). The image content information may be played back at both a display of host device 10 and display screens of wearable display device 16. It should be understood that the display of content at host device 10 is merely one example, and is not necessary in all examples. Wearable display device 16 may process the image content information received from host device 10 for presentation on its display screens and audio equipment. Wearable display device 16 may perform these operations with a computer processing unit and graphics processing unit that are limited by size and weight in order to fit within the structure of a handheld device. In one aspect, host device 10 may perform at least some processing of the image content information for presentation on wearable display device 16.

A user of wearable display device 16 may provide user input via an interface, such as a human interface device (HID), included within or connected to wearable display device 16. An HID may comprise one or more of a touch display, an input device sensitive to an input object (e.g., a finger, stylus, etc.), a keyboard, a tracking ball, a mouse, a joystick, a remote control, a microphone, or the like. As shown, wearable display device 16 may be connected to one or more body sensors and actuators 12 via universal serial bus (USB), which may be connected to one or more accessories 14 via Bluetooth™.

Wearable display device 16 sends the provided user input to host device 10. In some examples, wearable display device 16 sends the user input over a reverse channel architecture referred to as a user input back channel (UIBC). In this way, host device 10 may respond to the user input provided at wearable display device 16. For example, host device 10 may process the received user input and apply any effect of the user input on subsequent data such as image content information sent to wearable display device 16.

Host device 10 may be either a wireless device or a wired device with wireless communication capabilities. In one example, as a wired device, host device 10 may comprise one of a television, monitor, projector, set-top box, DVD or Blue-Ray Disc player, digital video recorder, laptop or desktop personal computer, video game console, and the like, that includes wireless communication capabilities. Other examples of host device 10 are possible. For example, host device 10 may be a file server that stores image content, and selectively outputs image content based on user input from display device 16. For instance, host device 10 may store 360-degree video content, and based on user input may output selected portions of the 360-degree video content to wearable display device 16. Accordingly, host device 10 need not necessarily include high end graphics processing units (GPUs) illustrated in FIG. 1 and described in more detail below in all examples. Host device 10 may be proximate to wearable display device 16 (e.g., in the same room), or host device 10 and wearable display device 16 may be in different locations.

As shown, host device 10 may be connected to a network 8 (e.g., the Internet) via a local area network (LAN). In another example, as a wireless device, host device 10 may comprise one of a mobile telephone, portable computer with a wireless communication card, personal digital assistant (PDA), portable media player, or other flash memory device with wireless communication capabilities, including a so-called "smart" phone and "smart" pad or tablet, or another type of wireless communication device (WCD).

Wearable display device 16 may comprise any type of wired or wireless display device that is worn on a user's body. As an example, wearable display device 16 may comprise a head-worn display or a head-mounted display (HMD) that is worn on a user's head in order to position one or more display screens in front of the user's eyes. In general, the display screens of wearable display device 16 may comprise one of a variety of display screens such as a liquid crystal display (LCD), a plasma display, an organic light emitting diode (OLED) display, or another type of display screen.

In one example, wearable display device 16 may comprise a HMD device formed as glasses that include display screens in one or more of the eye lenses, and also include a nose bridge and temple arms to be worn on a user's face. As another example, wearable display device 16 may comprise a HMD device formed as goggles that includes display screens in separate eye lenses or a single display screen, and that also includes at least one strap to hold the goggles on the user's head. Although wearable display device 16 is primarily described in this disclosure as being a HMD, in other examples wearable display device 16 may comprise display devices that are worn on other portions of the user's body, such as on the user's neck, shoulders, arm or wrist.

In split-rendered system 2, host device 10 and wearable display device 16 are typically wireless devices. For example, wearable display device 16 may comprise a wireless HMD (WHMD) that connects wirelessly to host device 10, and host device 10 may comprise a WCD, such as a mobile smart phone or smart pad. In this example, in addition to typical WCD operations, host device 10 performs at least some image content information processing for presentation on wearable display device 16 and user input processing from user interface interaction at wearable display device 16. While host device 10 and wearable display device 16 are shown as two separate devices in FIG. 1, in other embodiments, host device and 10 and wearable display device 16 may be combined into an all-in-one HMD.

In the example of FIG. 1, wearable display device 16 outputs sensor and/or actuator data to host device 10. The sensor and/or actuator data may include data from an eye tracker that generates eye pose data indicating which area of a scene the user may be focusing on. The sensor and/or actuator data may include data from a header tracker that generates head pose data including orientation and/or position information of the user's head position for determining a user's field of view. In response to receiving the sensor and/or actuator data, host device 10 may generate image content information for rendering a frame. For example, host device 10 may generate a compressed video and audio buffer using head pose data indicated by the sensor and/or actuator data. However, as discussed above, a user may have moved the wearable display device 16 such that the head pose has changed during the time for wearable display device 16 to transmit the eye pose data, for host device 10 to generate the compressed rendered video and audio buffers, and to transmit the compressed rendered video and audio buffers. To account for the change in head pose, wearable display device 16 may perform time and/or space warping to correct for a rotation of a user's head and to correct for a movement of a user's field of view toward (or away from) an object in a scene.

In one embodiment, the warping technique utilized by the host device might be APR, a flavor of ATW that utilizes depth information and reacts to 6DOF change in pose of the user (as opposed to the typical orientation-only ATW). In this case, host device 10 may generate a single depth plane data for pixels within a region of interest determined by the eye tracker to permit wearable display device 16 to correct for movement of a user's field of view toward (or away from) an object in a scene. That is, while generating the compressed rendered video and audio buffers, host device 10 may generate a single depth approximation for a region of interest that the user may be focusing on within the rendered frame using per-pixel depth values. In this way, less data may be transmitted from host device 10 to wearable display device 16 than transmitting per-pixel depth values of the scene in a whole frame (e.g., Z-buffer). The wearable display device 16 may perform time and space warping to correct for translation of head position and scene motion using the single depth metadata for the region of interest.

In one embodiment, host device 10 may generate a weighted depth value for pixels in the region of interest when generating the single depth approximation for the region of interest. For instance, host device 10 may assign larger weighting factor to pixels that are closer to a center of the region of interest than pixels that are farther away from the center. In this way, the depths of pixels that are nearer the center of the region of interest, and thus closer to the center of the user's gaze, are emphasized over the depths of those pixels that are away from the center of the gaze. In one embodiment, host device 10 may assign equal weighting to all pixels within the region of interest when generating the single depth approximation. In one embodiment, host device 10 may generate a harmonic mean of pixel depths within the region of interest for the single depth approximation of the scene. In one embodiment, the pixel depths within the region of interest may be weighted equally for generating the harmonic mean of the pixel depths. In one embodiment, the pixel depths within the region of interest may have spatial weighting factors that depend on the eye gaze information so that pixels that are nearer the center of the region of interest are assigned larger weighting factors.

After generating the single depth value approximation of the region of interest, host device 10 may output the single depth approximation value to wearable display device 16, which may perform, using the single depth approximation, time and space warping to correct for translation of head position and scene motion from their state in the last fully rendered frame.

In this way, wearable display device 16 represents an example wearable display device connected to a host device. The wearable display device may include one or more sensors configured to generate eye pose data indicating which area of a scene the user may be focusing on, head pose data indicating the user's field of view, one or more displays, and one or more processors implemented in circuitry. The one or more processors are configured to output a representation of the eye pose data and head pose data to the host device 10. The one or more processors are configured to receive a single depth approximation for a region of interest identified by the eye pose data and to receive an eye buffer representing the image content of the scene in the rendered frame from the host device 10. The rendered frame is generated using the head pose data. The one or more processors are further configured to modify one or more pixel values of the rendered frame using the single depth approximation to generate a warped rendered frame and output, for display at the one or more displays, the warped rendered frame.

Additionally, host device 10 represents an example of a host device connected to a wearable display device 16. The host device 10 may include one or more processors implemented in circuitry that are configured to generate image content information for a rendered frame based on head pose data received from the wearable display device 16. The rendered frame may include an eye-buffer representing the image content of the scene in the rendered frame, and a Z-buffer representing the depth pixels of the scene in the rendered frame. The host device 10 may generate a single depth approximation for a region of interest identified by the eye pose data received from the wearable display device 16. The one or more processors are further configured to send, to the wearable display device 16, the eye-buffer for the rendered frame and the single depth approximation for time and space warping. In some embodiments, the host device may determine a region of interest based on the content of the scene. For example, moving objects in the scene may represent a region of interest. The single depth approximation may be determined from such a region of interest determined from the content of the scene.

Figure 2:
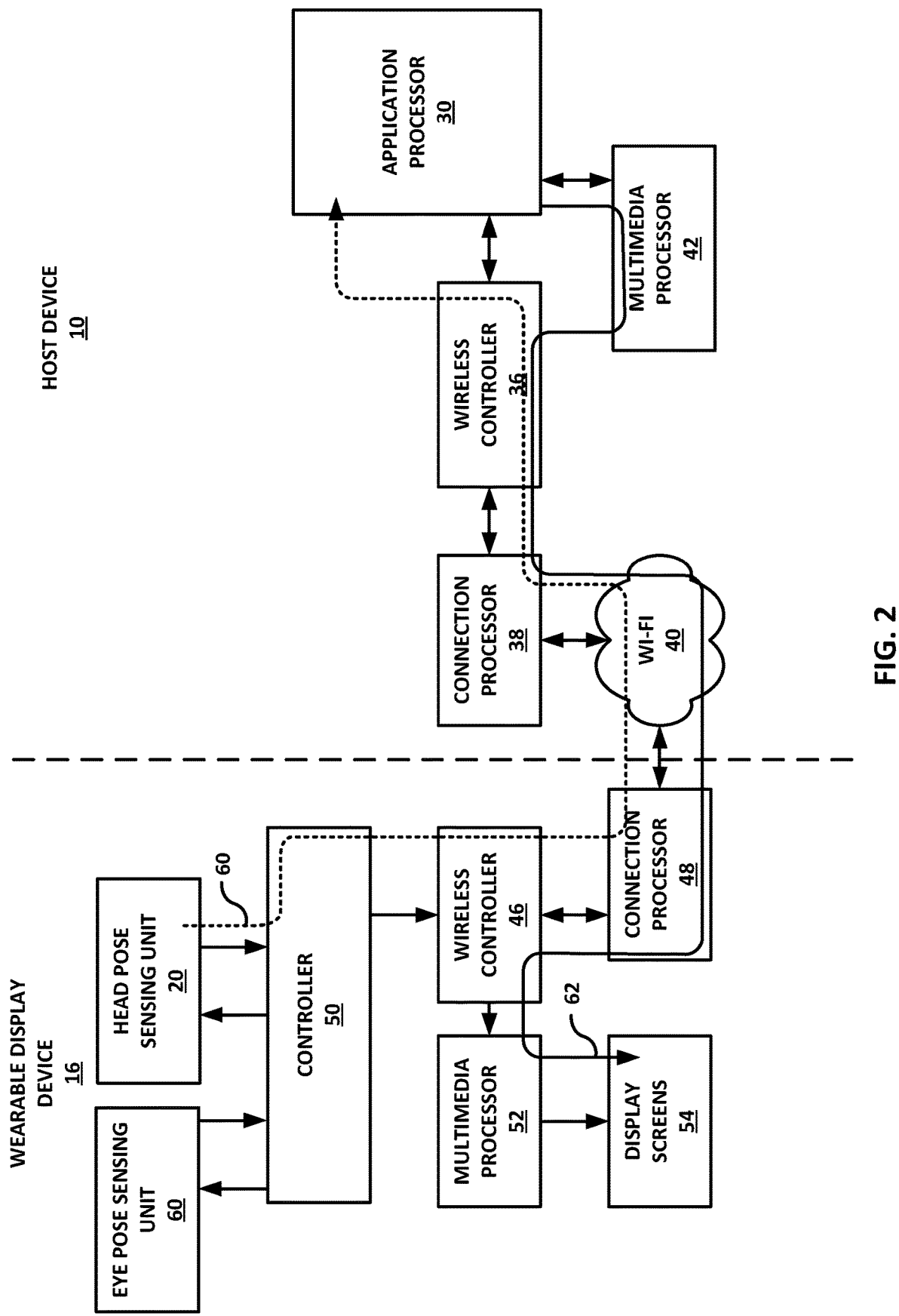
FIG. 2 is a block diagram illustrating the host device and wearable display device from FIG. 1 in greater detail.

FIG. 2 is a block diagram illustrating host device 10 and wearable display device 16 from FIG. 1 in greater detail. For purposes of this disclosure, host device 10 and wearable display device 16 will primarily be described as being wireless devices. For example, host device 10 may comprise a smart phone or smart pad, or other handheld WCD, and wearable display device 16 may comprise a WHMD device. In other examples, however, host device 10 and wearable display device 16 may comprise either wireless devices or wired devices with wireless communication capabilities.

In the example illustrated in FIG. 2, host device 10 includes an application processor 30, a wireless controller 36, a connection processor 38, and a multimedia processor 42. In other examples, host device 10 may comprise additional functional units or modules used to control and perform WCD operations.

Application processor 30 may comprise a general-purpose or a special-purpose processor that controls operation of host device 10. A user may provide input to host device 10 to cause application processor 30 to execute one or more software applications. The software applications that execute on application processor 30 may include, for example, an operating system, a word processor application, an email application, a spread sheet application, a media player application, a media editing application a video game application, a graphical user interface application, a teleconferencing application or another program. The user may provide input to host device 10 via one or more input devices (not shown) such as a keyboard, a mouse, a microphone, a touch pad or another input device that is coupled to host device 10.

The software applications that execute on application processor 30 may include one or more graphics rendering instructions that instruct multimedia processor 42 to render graphics data. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, application processor 30 may issue one or more graphics rendering commands to multimedia processor 42 to cause multimedia processor 42 to perform some or all of the rendering of the graphics data. In some examples, the graphics data to be rendered may include a list of graphics primitives, e.g., points, lines, triangles, quadrilaterals, triangle strips, etc.

As illustrated in FIG. 2, wearable display device 16 includes head pose sensing unit 20, eye pose sensing unit 60, wireless controller 46, connection processor 48, controller 50, multimedia processor 52, and display screens 54. Controller 50 comprises a main controller for wearable display device 16, and controls the overall operation of wearable display device 16.

Controller 50 may comprise a general-purpose or a special-purpose processor that controls operation of wearable display device 16. A user may provide input to wearable display device 16 to cause controller 50 to execute one or more software applications. The software applications that execute on controller 50 may include, for example, an operating system, a word processor application, an email application, a spread sheet application, a media player application, a media editing application a video game application, a graphical user interface application, a teleconferencing application or another program. The user may provide input to wearable display device 16 via one or more input devices (not shown) such as a keyboard, a mouse, a microphone, a touch pad or another input device that is coupled to wearable display device 16.

The software applications that execute on controller 50 may include one or more graphics rendering instructions that instruct multimedia processor 52 to render graphics data. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, application controller 50 may issue one or more graphics rendering commands to multimedia processor 52 to cause multimedia processor 52 to perform some or all of the rendering of the graphics data. In some examples, the graphics data to be rendered may include a list of graphics primitives, e.g., points, lines, triangles, quadrilaterals, triangle strips, etc.

Display screens 54 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display screens 54 may be integrated within wearable display device 16. For instance, display screens 54 may be a screen of a HMD. Alternatively, display screens 54 may be a stand-alone device coupled to wearable display device 16 via a wired or wireless communications link.

Head pose sensing unit 20 may include sensors and/or actuators for generating data indicative of a user's field of view. For example, head pose sensing unit 20 may generate head pose data (e.g., via accelerometers, gyroscope, eye-tracking circuitry, and the like) that indicates an angle of rotation of wearable display device 16 and a position of wearable display device 16. Eye pose sensing unit 60 may include sensors and/or actuators for tracking a user's gaze or a region the user is focusing on.

As shown, the transfer of eye pose data from wearable display device 16 to host device 10 is illustrated as a path 60. Specifically, controller 50 may receive head pose data from eye pose sensing unit 20. Multimedia processor 52 may receive head pose data from controller 50. Wireless controller 46 packages the head pose data, and connection processor 48 transmits the packaged user input over Wi-Fi network 40 to host device 10. At host device 10, connection processor 38 receives the transmitted head pose data, and wireless controller 36 un-packages the received user input for processing by multimedia processor 42. In this way, host device 10 may generate image data for a particular head pose of a user's field of view.

In general, host device 10 generates image content information for presentation at display screens 54. More specifically, multimedia processor 42 may generate image content information for a user's field of view that is indicated by head pose data generated by head pose sensing unit 20. For example, multimedia processor 42 may generate image content information that indicates one or more primitives arranged in a user's field of view that is indicated by head pose data generated by head pose sensing unit 20. In some examples, multimedia processor 42 may generate image content information that indicates a two-dimensional frame representative of the user's field of view.

Multimedia processor 42 may have access to per-pixel depth values for generating the image content information (e.g., eye buffer). For example, multimedia processor 42 may have access to per-pixel depth values to determine whether primitives of a scene are visible in the user's field of view. As such, multimedia processor 42 may generate depth data in a Z-buffer using the per-pixel depth values. For example, multimedia processor 42 may generate one or more depth values for the image content information.

In the example of FIG. 2, wearable display device 16 may receive, via path 62, image content information and depth data from host device 10. To transfer image content information and depth data from host device 10 to wearable display device 16, path 62 may begin at application processor 30.

Application processor 30 provides an environment in which a variety of applications may run on host device 10. Application processor 30 may receive data for use by these applications from internal or external storage location and/or internal or external sensors or cameras associated with host device 10. The applications running on application processor 30, in turn, generate image content information for presentation to a user of host device 10 and/or wearable display device 16. In other examples, path 62 may begin at multimedia processor 42 or some other functional device that either generates image content information or receives image content information directly from the storage locations and/or sensors or cameras.

Multimedia processor 42 may process the received image content information for presentation on display screens 54 of wearable display device 16. Wireless controller 36 packages the processed data for transmission. Packaging the processed data may include grouping the data into packets, frames or cells that may depend on the wireless communication standard used over Wi-Fi network 40. Connection processor 38 then transmits the processed data to wearable display device 16 using Wi-Fi network 40. Connection processor 38 manages the connections of host device 10, including a communication session with wearable display device 16 over Wi-Fi network 40, and the transmission and receipt of data over the connections.

The transfer of the image content information and depth data continues along path 62 at wearable display device 16 when connection processor 48 receives the transmitted data from host device 10. Similar to connection processor 38 of host device 10, connection processor 48 of wearable display device 16 manages the connections of wearable display device 16, including a communication session with host device 10 over Wi-Fi network 40, and the transmission and receipt of data over the connections. Wireless controller 46 un-packages the received data for processing by multimedia processor 52.

In split-rendered systems, there is a possibility that the user changes his or her eyes or head positions from the position they were in when the request of the image content information was transmitted. To account for this change in position, multimedia processor 52 may retrieve image content information and warp the frame content (e.g., shift or rotate the image content) in the direction in which the user moved his or her eyes and/or head, in what is referred to as a warping round. Otherwise, the user may experience judder, which can negatively impact the viewing experience. For example, multimedia processor 52 may warp the frame content with the aid of the single depth approximation of a region of interest identified from the eye pose data for presentation on display screens 54.

It should be understood that the rendered frame may be generated by multimedia processor 52 of wearable display device 16 using image content generated by multimedia processor 42 of host device 10 or, alternatively, the rendered frame may be generated by multimedia processor 42. In any case, multimedia processor 52 may perform one or more warping processes upon generating and/or receiving the rendered frame.

Figure 3:
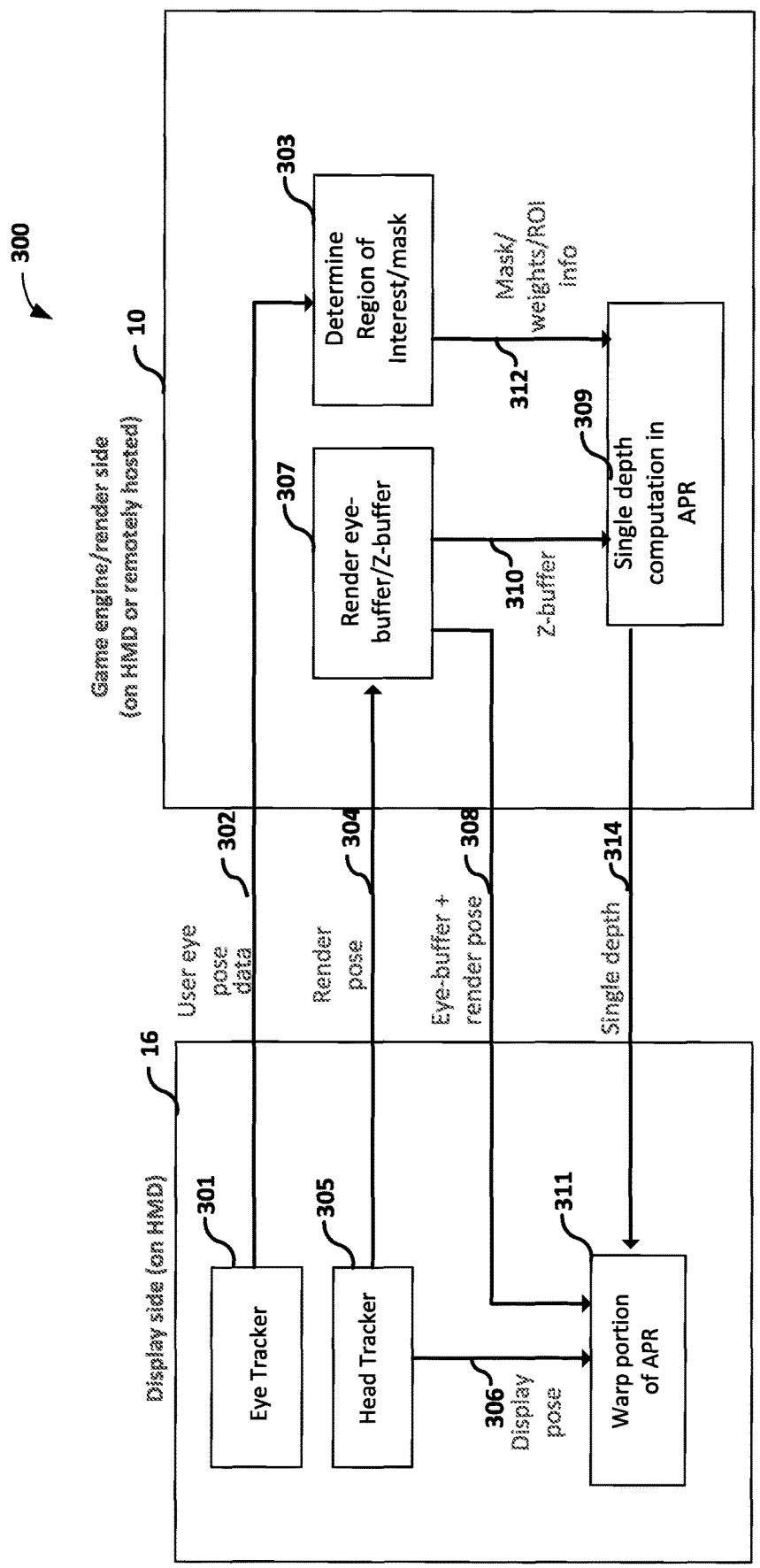
FIG. 3 is a conceptual block diagram illustrating an example process for warping a rendered frame using single depth metadata identified from a region of interest to correct for a camera translation and rotation, in accordance with one or more techniques described in this disclosure.

FIG. 3 is a conceptual block diagram 300 illustrating an example process for warping a rendered frame using single depth metadata identified from a region of interest to correct for a camera translation and rotation, in accordance with one or more techniques described in this disclosure. The block diagram includes a display side 16 and a game engine or render side 10. The display side 16 may be on the HMD worn by the user. The game engine/render side may be remotely hosted on a host. In one embodiment, the game engine/render side may be on an all-in-one HMD.

A eye tracker 301 of the display side 16 may generate user eye pose data 302 that may be used to indicate a region of a rendered frame that the user may be focusing on or is interested in. Eye tracker 301 may be a sensor, actuator, scanner, or other devices that may detect the user's focus. A module 303 of the game engine/render side 10 may receive the user eye pose data 302 and may determines a region of interest (ROI) in the image content using the eye pose data 302. In some embodiments, the module 303 may determine the ROI based on the content of the scene. For example, moving objects in the scene may represent the ROI. The ROI may be used to aid time and space warping, such as determining the single depth approximation of the ROI so that positional judder or other warping artifacts are minimized. In one embodiment, the ROI may be used to do foveated rendering. In foveated rendering, the ROI in an image frame (e.g., eye buffer) may be rendered at a higher level of detail or resolution than other regions so as to save on bandwidth for transmitting the eye buffer or to reduce the rendering load. In one embodiment, the ROI may be used to aid time and space warping in combination with using it for foveated rendering, thereby reducing the positional judder or other warping artifacts in the foveal region. In addition to generating the ROI from the user eye pose data 302, module 303 may generate weights that are applied to the pixel depth of pixels within the region of interest when generating the single depth approximation. For example, pixels near the center of the ROI may have higher weights so that the single depth approximation produces less error for pixels near the center of the ROI than for pixels near the periphery of the ROI. The assumption for the weights is that the user is more interested in the image near the center of the ROI and consequently it is desirable to minimize the warping artifacts near the center of the ROI. In one embodiment, the weights may be a monotonically decreasing function from the center of the ROI. In one embodiment, the weights may be uniform for all the pixels within the ROI and zero for pixels outside the ROI, effectively masking out the pixels outside the ROI. Module 303 generates the mask, weights, and/or ROI information 312.

A head tracker 305 on the display side 16 may generate render pose 304 to indicate the user's field of view. The head tracker 305 may be a sensor, actuator, or other devices that may detect the orientation and position of the head of the user in 6 DOF. A module 307 on the game engine/render side 10 may receive the render pose 304 and may render an eye-buffer frame and a Z-buffer frame of an image content to generate a rendered frame. The eye-buffer frame represents the image content to be displayed to the user based on the user's field of view represented by the render pose 304 and may include a left and a right eye-buffer frame. The Z-buffer frame may contain the pixel depth information of the image content. The module 307 may transmit information 308 containing the eye-buffer frame and the render pose 308 to the display side 16, and may transmit the z-buffer 310 to a single depth computation module for computation of the single depth approximation to aid the time and space warping.

A module 309 computes a single depth approximation of the ROI using the z-buffer 310 and the mask, weights, and/or ROI information 312. The single depth approximation may be used to aid time and space warping in APR. In APR, an entire visible surface of an image may be approximated as a single plane in 3D space, i.e., using a plane parallel to the image plane of the rendering camera. By calculating an optimal (scene-dependent) depth z* as an approximation of various depths of the scene, the entire z-buffer does not need to be transmitted to the display side 16 for warping. In one embodiment, the single depth approximation z* is computed as a harmonic mean of the pixel depths in the z-buffer. In APR, the single depth approximation z* is mapped to the image plane of the display camera via a homography. In one embodiment of homography, the single depth approximation z* is used to perform a depth-aware warp of the scene to account for the translation of display camera from the last rendered frame, followed by a depth-independent warp for the rotation of the display camera. Approximating the single depth approximation z* using the harmonic mean of the pixel depths of a scene implies that the single depth approximation z* is closer to objects that are nearby to the user compared to objects that are farther away. As such, the positional judder is reduced on nearby objects and the positional judder may not be perceptible when the user focuses on these objects. However, if the user focuses on objects further away, for example by focusing on a distant object when nearby objects are present on the periphery of the rendered frame, the positional judder may be perceptible due to the larger approximation error of the single depth approximation z* for the distant object. By using eye tracking to identify the ROI of the user, the error of the single depth approximation z* for the objects in the ROI may be reduced, thereby reducing the positional judder of the rendered frame near the user's gaze.

In one embodiment, module 309 may compute the single depth approximation z* for the scene using the harmonic mean of pixel depths within the ROI by applying the weights 312. For example, the single depth approximation z* may be computed as:

$$z^* = \Sigma_{(all\ pixels\ in\ ROI)}(w_i(e))/\Sigma_{(all\ pixels)}(w_i(e)/z_i) \quad [1]$$

where the $W_i(e)$ is a spatial weighting factor that is applied to the $i^{th}$ pixel having pixel depth $Z_i$. $W_i(e)$ is a function of the eye gaze information e with the highest weight being assigned for pixels at the center of gaze. For example, pixels near the center of the ROI may have higher weighting factor $W_i(e)$ so that the single depth approximation z* produces less error for pixels near the center of the ROI than for pixels near the periphery of the ROI.

In one embodiment, module 309 may compute the single depth approximation z* for the scene using the harmonic mean of pixel depths within the region of interest by applying a uniform weight to all the pixels within the region of interest. For example, the single depth approximation z* may be computed as:

$$z^* = \Sigma_{(all\ pixels\ in\ ROI)} 1/\Sigma_{(all\ pixels)}(1/z_i) \quad [2]$$

where a uniform weight of 1 is applied to all the pixels in the ROI. Pixels outside of the ROI are masked out. Because the harmonic mean of the pixel depths in the ROI inherently produces better approximation for nearby pixels than farther pixels, even with uniform weight applied to the ROI, the approximating error is reduced compared to when there is no ROI due to the masking of the pixels outside of the ROI. The module 309 may transmit a single depth approximation z* 314 to the display side 16.

A module 311 on the display side 16 may perform warping in APR using the single depth approximation z* 314, the eye buffer frame and render pose information 308 received from the game engine/render side 10, and the display pose 306 received from the head tracker 305. In one embodiment, the single depth approximation z* is used to perform a depth-aware warp of the eye-buffer to account for a translation of head tracker 305 from the render pose 304 used to generate the eye-buffer to the display pose 306, followed by a depth-independent warp for a rotation of the head tracker 305.

In one embodiment, instead of determining the ROI from user eye pose data 302, the ROI may be determined from content analysis of the eye-buffer scene. For example, module 303 may receive a user's field of view based on render pose 304 and may determine objects within the user's field of view. Module 303 may assign a pre-determined score or a saliency value for each object in the field of view as a function of the importance or saliency of the object. In one aspect, the saliency value may be determined from the motion vectors of the object such that objects with greater motion may be assigned higher saliency values. After the saliency values of the objects are assigned, module 303 may determine which region of the eye-buffer scene has the highest saliency. For example, module 303 may determine which square region of 256×256 pixels within the eye buffer (or may be based on larger square regions, e.g., 1024×1024 pixels) has the highest aggregate saliency values. Module 303 may identify such a region as the ROI for the computation of the single depth approximation using the z-buffer 310 for aiding time and space warping in APR.

Figure 4:
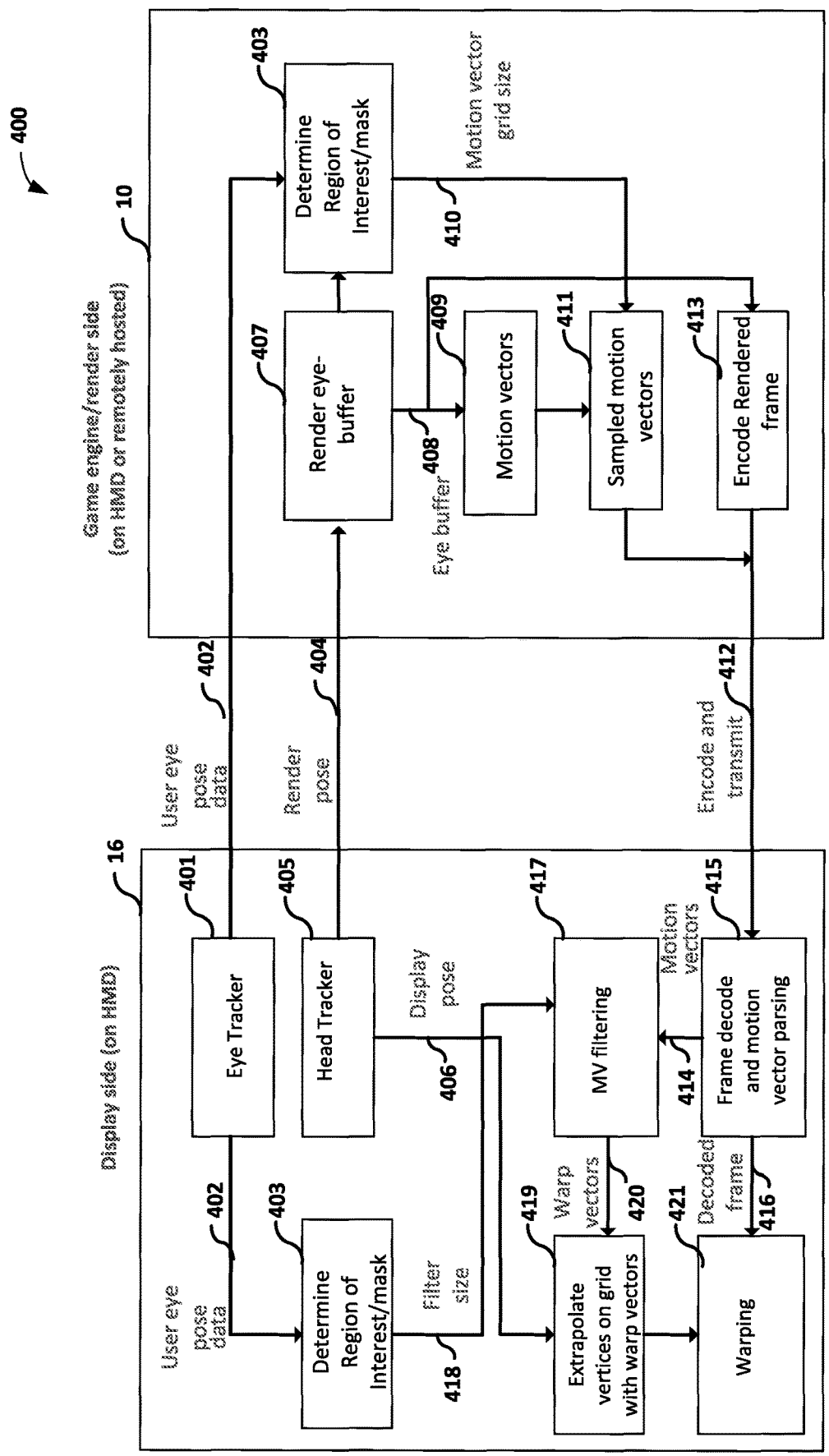
FIG. 4 is a conceptual block diagram illustrating an example process for warping a rendered frame using motion vector grid size and motion vector filter kernel size identified from a region of interest to account for motion of objects, in accordance with one or more techniques described in this disclosure.

FIG. 4 is a conceptual block diagram illustrating an example process for warping a rendered frame using motion vector grid size and motion vector filter kernel size identified from a region of interest to account for motion of objects, in accordance with one or more techniques described in this disclosure. The block diagram includes a display side 16 and a game engine or render side 10. The display side 16 may be on the HMD worn by the user. The game engine/render side may be remotely hosted on a host. In one embodiment, the game engine/render side may be on an all-in-one HMD.

An eye tracker 401 of the display side 16 may generate user eye pose data 402. The eye tracker 401 may operate similarly to the eye tracker 301 of FIG. 3. A module 403 of the same engine/render side 10 may receive the user eye pose data 402 and may determines a region of interest (ROI) in the image content using the eye pose data 402.

The region of interest may be determined based on eye tracking or content information. In one aspect, in ASW, which extrapolates the motion of objects while performing warping, the game engine/render side 10 may determine a motion vector grid size used for sampling motion vectors on a grid of vertices based on an analysis of content within the region of interest. The display side 16 may determine a motion vector filter kernel size used for filtering motion vectors based on an analysis of content within the region of interest. The region of interest that contains the content information of a scene for the analyses may be determined based on eye tracking. In ASW, there is a trade-off between the motion vector grid size, the motion vector filter kernel size, positional judder, and texture stretching to fill disocclusions.

In ASW, there are information about the motion of different regions in the frame, but no depth information or foreground/background is used. When the motion causes a foreground object to slide over its background, ASW may not be able to resolve the resulting occlusion. In addition, in the process of warping, some triangles of objects in the foreground may land on top of the background as they are expected to, but some other triangles of objects in the background may come to the foreground. The result is an effect called z-fighting that breaks objects near their edges. To avoid z-fighting, the motion vectors may be smoothed using a 2D-filter so that large differences in motion vectors between adjacent grid vertices is reduced. However, filtering may result in spreading the motion of moving objects to neighboring regions that are supposed to be stationary, resulting in stretching and deformation. The choice of the 2D-filter to smooth the motion vectors may depend on the maximum difference between motion vectors of adjacent grid vertices. There is a trade-off between positional judder/distortion and z-fighting. The larger the filter kernel, the higher the positional judder or distorted edges but lesser z-fighting artifacts.

Another parameter choice that affects the quality of the warped frame in ASW is the granularity of sampling the motion vectors, i.e., spacing between grid points (e.g., vertices) or motion vector grid size. For the same filter kernel size, a larger motion vector grid size may reduce z-fighting but may introduce distortion. For example, the more granular the motion vector grid (i.e., one motion vector for 16×16 pixels as opposed to 4×4 pixels), the less precise the representation of motion vector of individual points in the grid and the higher the positional judder. On the other hand, a granular motion vector grid may mean less texture stretching to fill disocclusions and also lower bit-rate is needed for transmission. Eye tracking information provides a ROI that may be analyzed to aid in the tradeoff to determine the choice of motion vector grid size and filter kernel size. For example, if the eye-tracking indicates that the user is focusing on a region largely covered by a single object, disocclusions may be less of an issue, and a finer motion vector grid size may be chosen to represent the motion of the objects. In one aspect, the motion vector filter kernel size may be determined by the maximum difference between motion vectors within the ROI so as to de-emphasize spurious fast moving objects that may be outside of the ROI. In one embodiment, the ROI may be analyzed to determine which warping techniques work best, i.e., produce the least display artifacts, in that region and the result of the analysis may be used to switch between different time and space warping techniques, such as between APR and ASW.

The module 403 of game engine/render side 10 may determine the ROI from the user eye pose data 402 and may analyze the content within the ROI to determine the motion vector grid size 410 for sampling the motion vectors. In one aspect, if a moving objet in the ROI may cause disocclusions, a large motion vector grid size 410 would cause distortion or stretching of corners, so choosing a finer grid size may be desirable. In one aspect, if a moving object in the ROI may occlude the background, thus increasing a likelihood of z-fighting, then it may be desirable to choose a larger motion vector grid size. Therefore, the process of choosing metadata to aid the warp using the motion vectors may be influenced by the ROI and the content within the ROI.

A head tracker 405 on the display side 16 may generate render pose 404 to indicate the user's field of view. The head tracker 405 may operate similarly to the head tracker 305 in FIG. 3. A module 407 on the game engine/render side 10 may receive the render pose 404 and may render an eye-buffer frame 408 of an image content to generate a rendered frame. The eye-buffer frame 408 represents the image content to be displayed to the user based on the user's field of view represented by the render pose 404 and may include a left and a right eye-buffer frame. A module 409 may generate motion vectors for the pixels in the rendered frame. The motion vector for a pixel indicates the difference in location from the location of the pixel corresponding to the same point in the same object in the previous rendered frame.

A module 411 may sample the motion vectors on a grid of vertices determined by the motion vector grid size 410 overlaid on the eye-buffer frame 408 to generate the sampled motion vectors. The motion vector grid size 410 may be determined from the ROI by module 403 of the game engine/render side 10. A module 413 may encode the eye buffer 408 to generate an encoded rendered frame. The encoded rendered frame and the sampled motion vectors 412 may be transmitted to the display side 16.

On the display side 16, a module 415 may receive the encoded rendered frame and the sampled motion vector 412 and may decode the encoded rendered frame to generate the decoded frame 416. The module 415 may parse the sampled motion vectors to generate the parsed motion vectors 414.

A module 403 on the display side 16, similar to the module 403 on the game engine/render side 10, may determine the ROI from the user eye pose data 402 and may analyze the content within the ROI to determine the motion vector filter kernel size 418 for filtering the parsed motion vectors 414. For example, if most of the points in the ROI are moving, the difference between motion vectors of adjacent vertices in the ROI may be less. As such, there may not be a need to smooth the motion vectors, so a smaller motion vector filter kernel size 418 may be desirable.

A module 417 may filter the parsed motion vectors 414 using the motion vector filter kernel size 418 to reduce large difference in movements between neighboring vertices, to smooth out opposing motion, and to reduce z-fighting. The module 417 may filter the motion vectors to generate warp vectors 420.

A module 419 may receive the warp vectors 420 and may extrapolate the locations of the vertices on the grid to a new position based on the warp vectors 420 and may re-project those vertices to a display pose 406 received from the head tracker 405 via homography that depends on the change in orientation between the render pose 404 and the display pose 406.

A module 421 may use the warp vectors 420 with the decoded frame 416 to perform ASW warping of the decoded frame 416. In one embodiment, a fragment shader and a rasterization operation may be performed to create the displayed frame.

Figure 5:
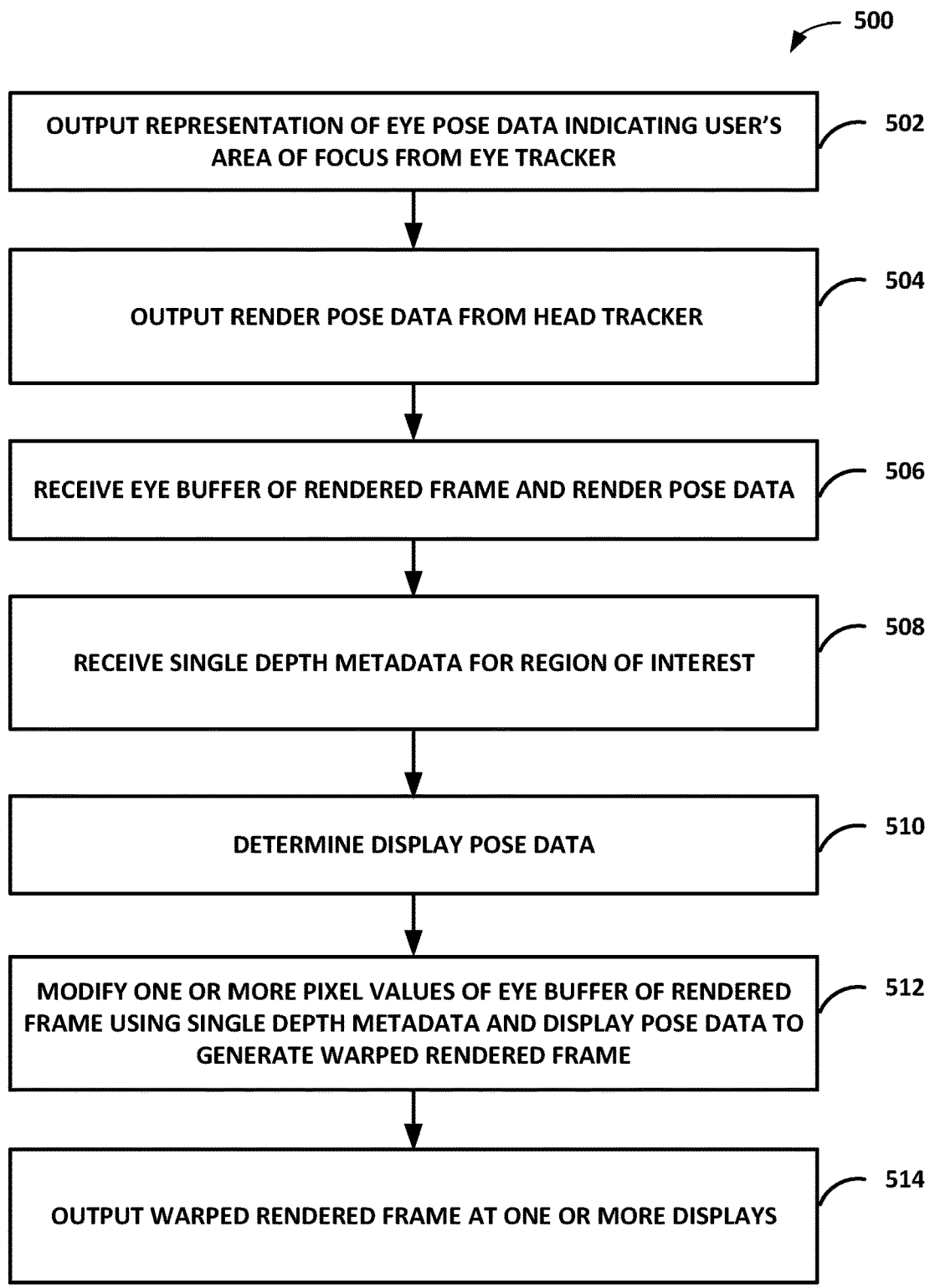
FIG. 5 is a flowchart illustrating an example process of warping a rendered frame using single depth metadata identified from a region of interest to correct for a camera translation and rotation, in accordance with one or more techniques described in this disclosure.

FIG. 5 is a flowchart illustrating an example process of warping a rendered frame using single depth metadata identified from a region of interest to correct for a camera translation and rotation, in accordance with one or more techniques described in this disclosure. The display side 16 may perform the process of FIG. 5 for the APR warping operation of FIG. 3.

In 502, the display side 16 may output representation of eye pose data indicating user's area of focus from the eye tracker. The eye pose data may be used to indicate a region of a rendered frame that the user may be focusing on or is interested in. In 504, the display side 16 may output render pose data from the head tracker. The render pose may include information on the orientation and position of the head of the user in 6 DOF. In 506, the display device 16 may receive eye-buffer of a rendered frame and render pose data, such as from the game engine/render side 10. In 508, the display device 16 may receive single depth metadata for a region of interest. The single depth metadata for the ROI may be the single depth approximation z* for the ROI computed from the harmonic mean of the pixel depths within the ROI. In 510, the display side 16 may determine or receive the display pose data from the head tracker. In 512, the display side 16 may modify one or more pixel values of the eye-buffer of the rendered frame using the single depth metadata and display pose data to generate warped rendered frame. In 514, the display device 16 may output the warped rendered frame for display at one or more displays.

Figure 6:
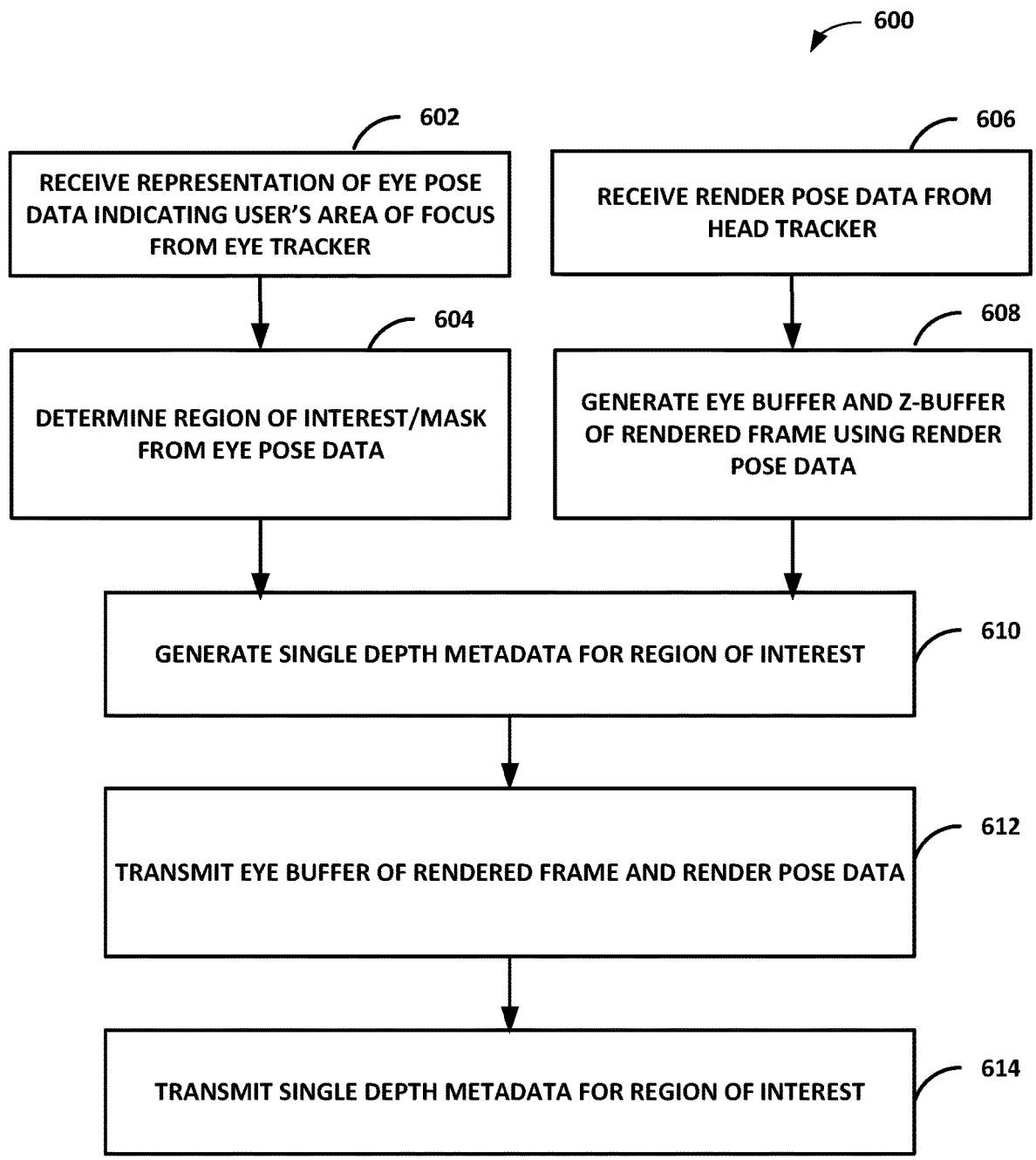
FIG. 6 is a flowchart illustrating an example process of generating single depth metadata from a region or interest based on eye tracking information for warping a rendered frame to correct for a camera translation and rotation, in accordance with one or more techniques described in this disclosure.

FIG. 6 is a flowchart illustrating an example process of generating single depth metadata from a region of interest based on eye tracking information for warping a rendered frame to correct for a camera translation and rotation, in accordance with one or more techniques described in this disclosure. The game engine/render side 10 may perform the process of FIG. 6 to generate the single depth approximation of the ROI for the APR warping operation of FIG. 3.

In 602, the game engine/render side 10 may receive representation of eye pose data indicating user's area of focus from the eye tracker of the display side 16. In 604, the game engine/render side 10 may determine the ROI and may generate information on the weighting factors and mask for the pixels in the ROI. In 606, the game engine/render side 10 may receive render pose data from the head tracker of the display side 16. In 608, the game engine/render side 10 may generate the eye-buffer and the z-buffer of the rendered frame using the render pose data. In 610, the game engine/render side 10 may generate the single depth metadata for the ROI. For example, the single depth metadata for the ROI may be the single depth approximation z* for the region of interest computed from the harmonic mean of the pixel depths within the ROI. In 612, the game engine/render side 10 may transmit the eye-buffer of rendered frame and the render pose data to the display side 16. In 614, the game engine/render side 10 may transmit the single depth metadata for the ROI to the display side 16 for the display side 16 to perform the APR warping operation of the eye-buffer using the single depth metadata.

Figure 7:
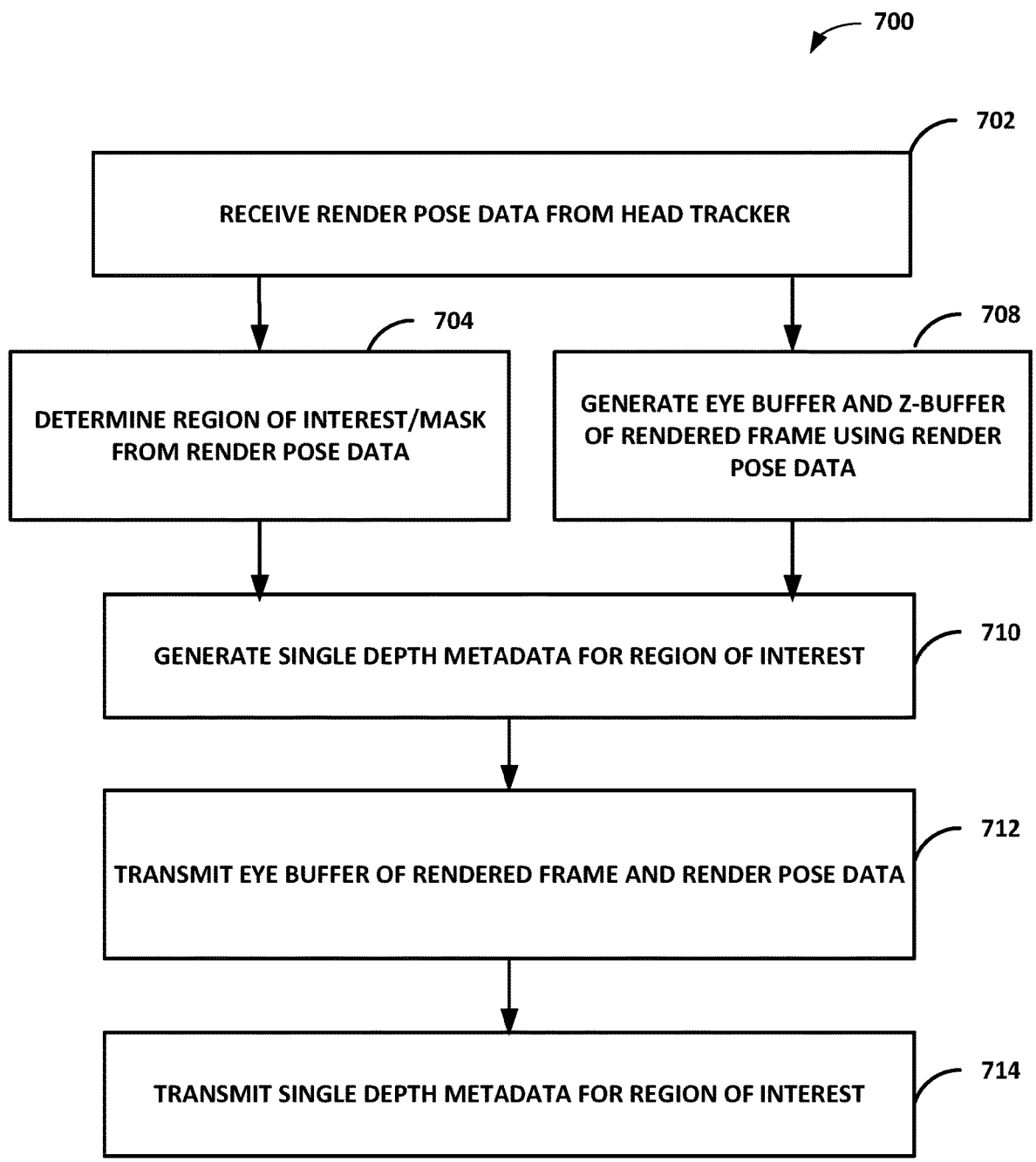
FIG. 7 is a flowchart illustrating an example process of generating single depth metadata from a region of interest based on content analysis for warping a rendered frame to correct for a camera translation and rotation, in accordance with one or more techniques described in this disclosure.

FIG. 7 is a flowchart illustrating an example process of generating single depth metadata from a region of interest based on content analysis for warping a rendered frame to correct for a camera translation and rotation, in accordance with one or more techniques described in this disclosure. The game engine/render side 10 may perform the process of FIG. 7 to generate the single depth approximation of the ROI for the APR warping operation of FIG. 3.

In 702, the game engine/render side 10 may receive render pose data from the head tracker of the display side 16. In 704, the game engine/render side 10 may determine the ROI from content analysis of the eye-buffer scene of the render pose and may generate information on the weighting factors and mask for the pixels in the ROI. In one aspect, game engine/render side 10 may receive a user's field of view based on the render pose and may analyze objects within the user's field of view to determine the ROI. Game engine/render side 10 may assign a pre-determined score or a saliency value for each object in the field of view as a function of the importance or saliency of the object. In one aspect, the saliency value may be determined from the motion vectors of the object such that objects with greater motion may be assigned higher saliency values. After the saliency values of the objects are assigned, game engine/render side 10 may determine which region of the eye-buffer scene has the highest saliency. For example, game engine/render side 10 may determine which square region of 256×256 pixels within the eye buffer (or may be based on larger square regions, e.g., 1024×1024 pixels) has the highest aggregate saliency values. Game engine/render side 10 may identify such a region as the ROI for the computation of the single depth approximation using the z-buffer 310 for aiding time and space warping in APR.

In 708, the game engine/render side 10 may generate the eye-buffer and the z-buffer of the rendered frame using the render pose data. In 710, the game engine/render side 10 may generate the single depth metadata for the ROI. For example, the single depth metadata for the ROI may be the single depth approximation z* for the region of interest computed from the harmonic mean of the pixel depths within the ROI. In 712, the game engine/render side 10 may transmit the eye-buffer of rendered frame and the render pose data to the display side 16. In 714, the game engine/render side 10 may transmit the single depth metadata for the ROI to the display side 16 for the display side 16 to perform the APR warping operation of the eye-buffer using the single depth metadata.

Figure 8:
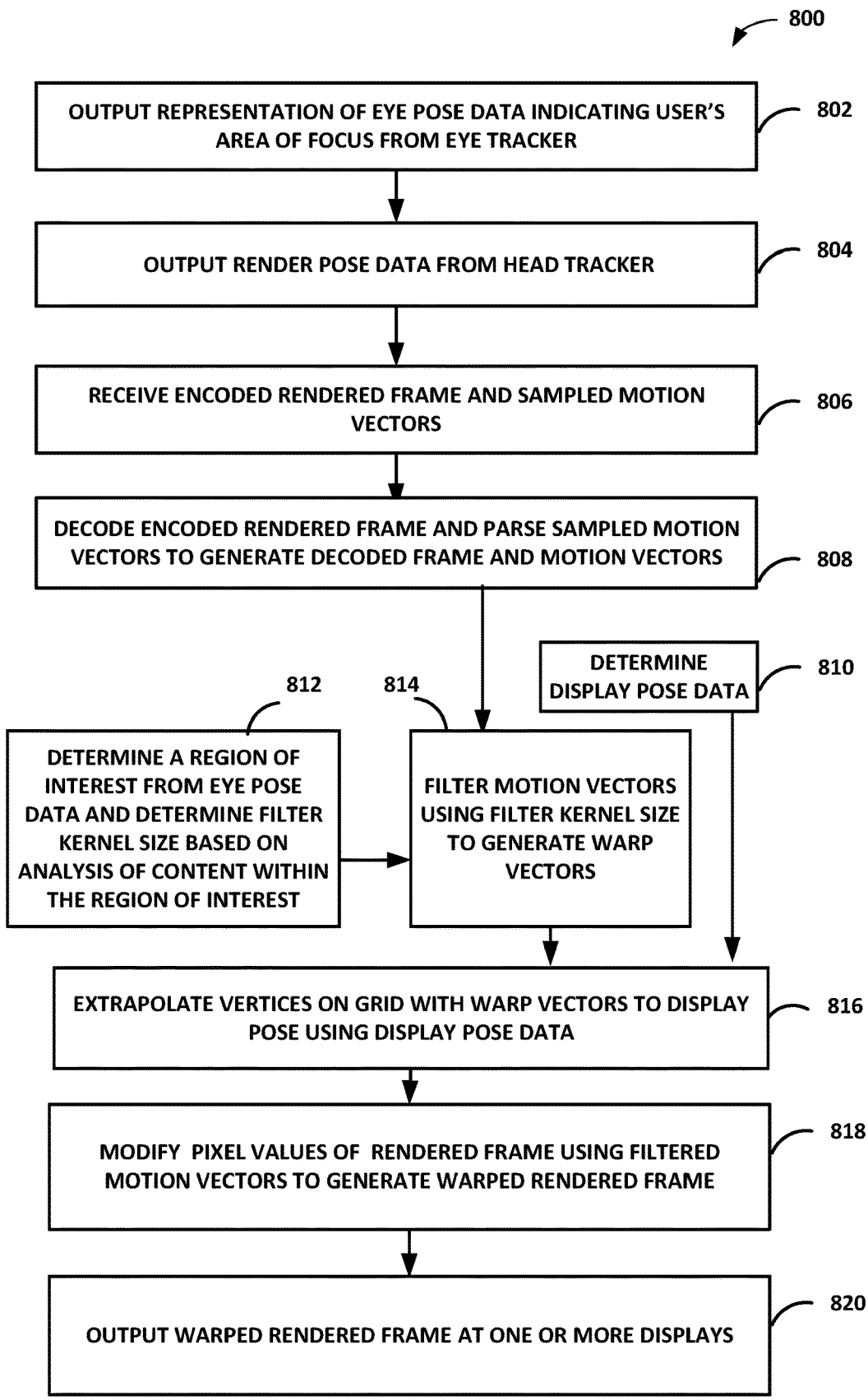
FIG. 8 is a flowchart illustrating an example process of generating motion vector filter kernel size identified from a region of interest for warping a rendered frame to account for motion of objects, in accordance with one or more techniques described in this disclosure.

FIG. 8 is a flowchart illustrating an example process of generating motion vector filter kernel size identified from a region of interest for warping a rendered frame to account for motion of objects, in accordance with one or more techniques described in this disclosure. The display side 16 may perform the process of FIG. 8 for the ASW operation of FIG. 4.

In 802, the display side 16 may output representation of eye pose data indicating user's area of focus from the eye tracker. The eye pose data may be used to indicate a region of a rendered frame that the user may be focusing on or is interested in. In 804, the display side 16 may output render pose data from the head tracker. The render pose may include information on the orientation and position of the head of the user in 6 DOF. In 806, the display device 16 may receive encoded rendered frame and sampled motion vectors, such as from the game engine/render side 10. In 808, the display device 16 may decode the encoded rendered frame and may parse the sampled motion vectors to generate a decoded frame and parsed motion vectors. In 810, the display device 16 may determine or receive the display pose data from the head tracer. In 812, the display device 16 may determine a ROI from eye pose data and may determine the motion vector filter kernel size based on an analysis of the content within the ROI. In one embodiment, the display device 16 may determine the ROI from content analysis of the eye-buffer scene of the render pose. In 814, the display device 16 may filter the parsed motion vectors using the motion vector filter kernel size to generate warp vectors. In 816, the display device 16 may receive the warp vectors and may extrapolate the locations of the vertices on the grid to a new position based on the warp vectors and may re-project those vertices to display pose data via homography that depends on the change in orientation between the render pose and the display pose. In 818, the display device 16 may modify the pixel values of the rendered frame using the filtered motion vectors to generate warped rendered frame. At 820, the display device 16 may output the warped rendered frame for display at one or more displays.

Figure 9:
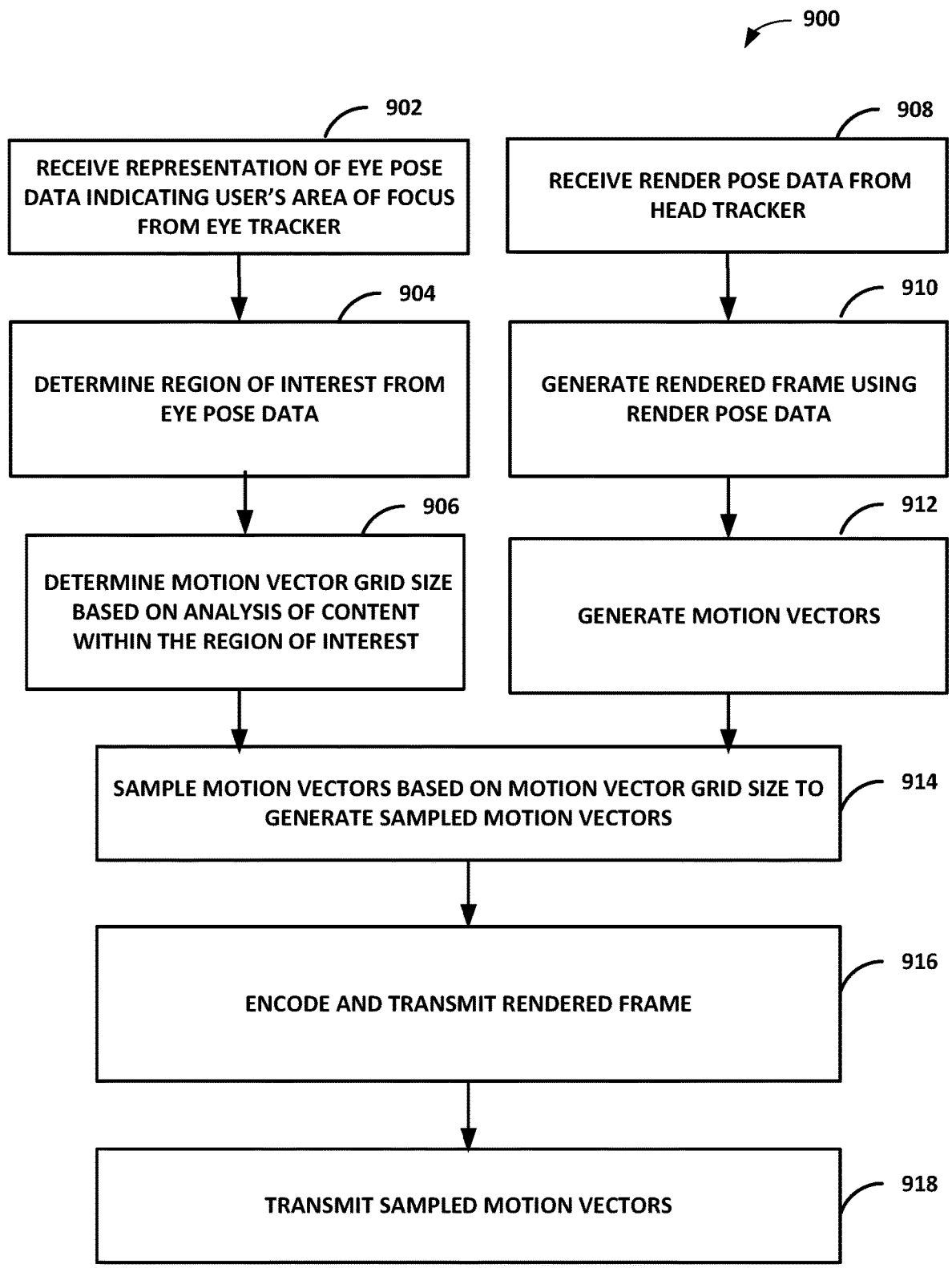
FIG. 9 is a flowchart illustrating an example process of determining a motion vector grid size based on analysis of content within a region of interest for sampling motion vectors for warping a rendered frame to account for motion of objects, in accordance with one or more techniques described in this disclosure.

FIG. 9 is a flowchart illustrating an example process of determining a motion vector grid size based on analysis of content within a region of interest for sampling motion vectors for warping a rendered frame to account for motion of objects, in accordance with one or more techniques described in this disclosure. The game engine/render side 10 may perform the process of FIG. 9 to generate the sampled motion vectors based on the motion vector grid size determined from an analysis of content within the ROI for the ASW warping operation of FIG. 4.

In 902, the game engine/render side 10 may receive representation of eye pose data indicating a user's area of focus from the eye tracker of the display side 16. In 904, the game engine/render side 10 may determine the ROI from the eye pose data. In one embodiment, the game engine/render side 10 may determine the ROI from content analysis of the eye-buffer scene of the render pose. In 906, the game engine/render side 10 may determine the motion vector grid size based on an analysis of the content within the ROI. In 908, the game engine/render side 10 may receive render pose data from the head tracker of the display side 16. In 910, the game engine/render side 10 may generate a rendered frame using the render pose data. In 912, the game engine/render side 10 may generate the motion vectors from the rendered frame. In 914, the game engine/render side 10 may sample the motion vectors based on the motion vector grid size to generate sampled motion vectors 914. In 916, the game engine/render side 10, the game engine/render side 10 may encode and transmit the encoded rendered frame to the display side 16. In 918, the game engine/render side 10 may transmit the sampled motion vectors to the display side 16 for the display side 16 to perform the ASW operation of the rendered frame using the sampled motion vectors.

In one embodiment, the ROI determined from eye tracking may be used for vector streaming. Vector streaming is an alternative approach to pixel streaming that addresses the issue of disocclusions when warping to a new pose. For each rendered eye-buffer, vector streaming computes a "potentially visible set" (PVS) of triangles in the scene. This includes what triangles of objects are "exactly visible from the render head pose (also captured in pixel streaming) as well as what could become visible when the user moves to a different pose. The PVS includes in it textures to paint these disocclusions. However, the computation of PVS may be expensive and may require transmission of additional data from the rendering device to the display device. In one embodiment, the generation of PVS may be simplified by accounting for the ROI obtained via eye tracking. The PVS may only need to look behind the visible scene in the ROI and not everywhere in the rendered frame. Thus, the generated PVS may be smaller and may incur less overhead.

In one embodiment, characters or objects in a scene may be explicitly marked as salient and the ROI in an eye-buffer may be that segment containing this salient content. In one embodiment, a ROI may be flagged for a region containing a moving object, because motion in the scene may draw our focus. As such, the metadata to aid the warping operation, whether as single depth approximation in APR, motion vector grid size or filter kernel size in ASW, or for PVS in vector streaming, may be determined to improve the warp quality either using the ROI from eye tracking or using the ROI determined from an analysis of objects in a scene.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. In some examples, computer-readable media may comprise non-transitory computer-readable media. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blue-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for warping a rendered frame by a client device comprising:
   transmitting eye tracking information of a user, wherein the eye tracking information is used to determine a region of interest (ROI);
   transmitting head tracking information of the user;
   receiving a rendered frame and metadata, wherein the rendered frame is based on the head tracking information and the metadata is based on the ROI of the rendered frame, wherein the metadata comprises a single depth approximation of a plurality of pixel depths of pixels within the ROI of the rendered frame;
   determining display pose information of the user; and
   warping the rendered frame based on the metadata and the display pose information.

2. The method of claim 1, further comprising:
   analyzing content information of the rendered frame within the ROI;
   generating a motion vector filter kernel size based on analyzing the content information of the rendered frame within the ROI;
   receiving a plurality of motion vectors of the rendered frame;
   filtering the plurality of motion vectors of the rendered frame using the motion vector filter kernel size to generate warp vectors; and
   warping the rendered frame based on the warp vectors.

3. The method of claim 1, wherein warping the rendered frame based on the metadata and the display pose information comprises:
   warping the rendered frame to take into account the single depth approximation of the pixels within the ROI based on a translation of the client device determined from the head tracking information and the display pose information; and
   warping the rendered frame independent of the single depth approximation of the pixels within the ROI based on a rotation of the client device determined from the head tracking information and the display pose information.

4. The method of claim 1, wherein warping the rendered frame based on the metadata and the display pose information comprises:
   generating potentially visible triangles in the rendered frame for vector streaming only for the ROI of the rendered frame based on the metadata; and warping the rendered frame based on the potentially visible triangles in the rendered frame.

5. An apparatus, comprising:

a memory storing processor readable code; and a processor coupled to the memory and configured to execute the processor readable code to cause the apparatus to:

transmit eye tracking information of a user, wherein the eye tracking information is used to determine a region of interest (ROI);

transmit head tracking information of the user;

receive a rendered frame and metadata, wherein the rendered frame is based on the head tracking information and the metadata is based on the ROI of the rendered frame, wherein the metadata comprises a single depth approximation of a plurality of pixel depths of pixels within the ROI of the rendered frame;

determine display pose information of the user; and warp the rendered frame based on the metadata and the display pose information.

6. The apparatus of claim 5, wherein the processor when executing the processor readable code further causes the apparatus to:

analyze content information of the rendered frame within the ROI;

generate a motion vector filter kernel size based on the content information analyzed;

receive a plurality of motion vectors of the rendered frame;

filter the plurality of motion vectors of the rendered frame using the motion vector filter kernel size to generate warp vectors; and warp the rendered frame based on the warp vectors.

7. The apparatus of claim 5, wherein to warp the rendered frame based on the metadata and the display pose information, the processor when executing the processor readable code further causes the apparatus to:

warp the rendered frame to take into account the single depth approximation of the pixels within the ROI based on a translation of the apparatus determined from the head tracking information and the display pose information; and warp the rendered frame independent of the single depth approximation of the pixels within the ROI based on a rotation of the apparatus determined from the head tracking information and the display pose information.

8. The apparatus of claim 5, wherein to warp the rendered frame based on the metadata and the display pose information, the processor when executing the processor readable code further cause the apparatus to:

generate potentially visible triangles in the rendered frame for vector streaming only for the ROI of the rendered frame based on the metadata; and warp the rendered frame based on the potentially visible triangles in the rendered frame.

* * * * *